J. C. BAXTER.
Manufacture of Wine.

No. 139,757. Patented June 10, 1873.

Witnesses —
J. V. Knight
Donald Stuart

Inventor
John C. Baxter
by P. Hanway
Atty.

UNITED STATES PATENT OFFICE.

JOHN C. BAXTER, OF WASHINGTON, DISTRICT OF COLUMBIA.

IMPROVEMENT IN THE MANUFACTURE OF WINE.

Specification forming part of Letters Patent No. 139,757, dated June 10, 1873; application filed February 3, 1873.

*To all whom it may concern:*

Be it known that I, JOHN C. BAXTER, of the city and county of Washington, in the District of Columbia, have invented a certain new and Improved Wine, to be manufactured from oranges or lemons, of which the following is a specification, reference being had to to the accompanying drawings, in which—

Figure 1:
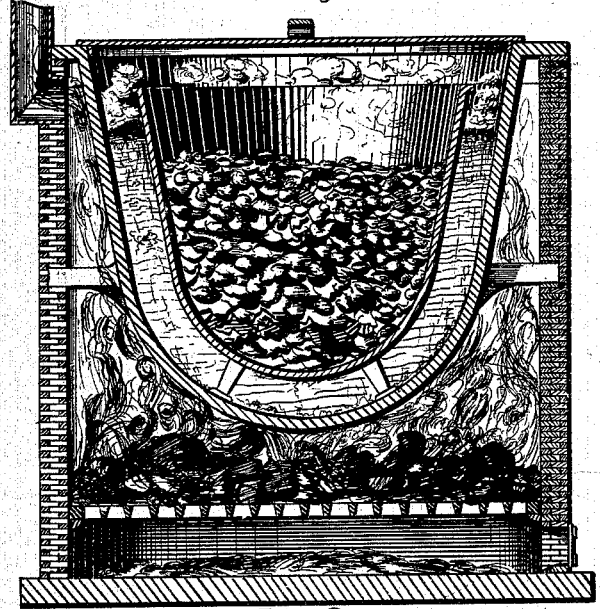
Figure 2:
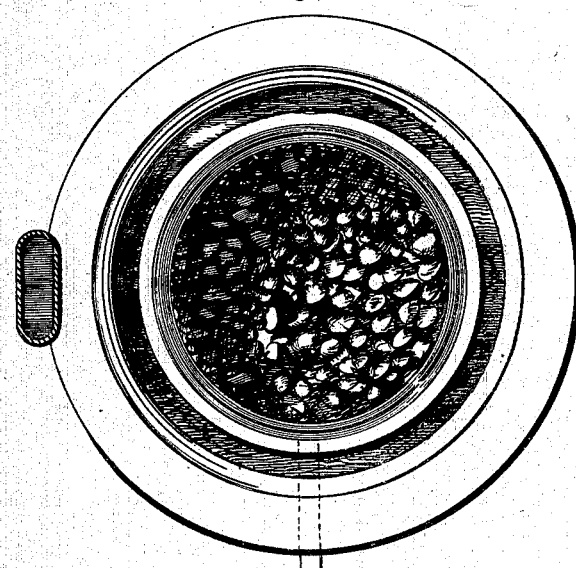
Figure 3:
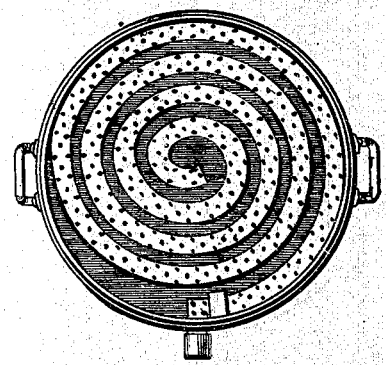
Figure 4:
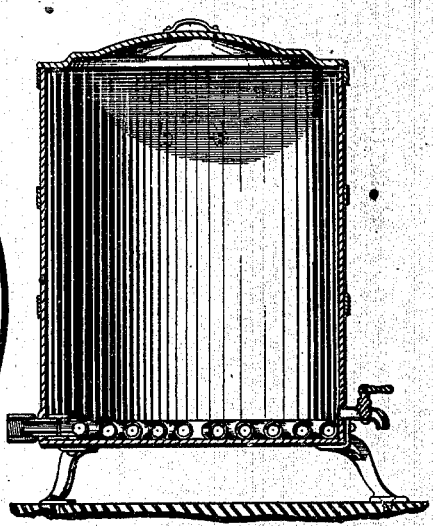

Figure 1 represents a vertical section of a boiler suitable for carrying the boiling part of my operation into effect, and Fig. 2 a plan of the same with the cover removed. Fig. 3 represents a plan of a modified form of boiler, and Fig. 4 a vertical section of the same.

My invention relates to the manufacture of wine for medical and other purposes from that class of fruit of which the orange, lime, and lemon are the representatives; and it consists in first cooking or boiling the fruit, or in digesting it with steam, in order to extract its essential oils and aromatic principles before subjecting it to vinous fermentation, thereby increasing its qualities as a febrifuge and as a pleasant stimulant for invalids.

In preparing to manufacture the wine the fruit is carefully selected, all that is unsound and imperfectly ripened being rejected. The fruit thus selected is then either bruised or otherwise cut to pieces and transferred to a large boiler or vat into which the end of a steam-pipe is introduced, and allowed to remain there until thoroughly cooked or digested, after which it is allowed to settle for a time, and the liquid portion then withdrawn by a faucet suitably arranged for the purpose and placed in the fermenting-vessel. The residuary or solid portion of the fruit is then withdrawn and placed in the wine-press, where it is subjected to pressure in order to remove the remaining liquid portion, which is then transferred to the fermenting-vessel along with the portion first removed. The boiling-vat is then re-filled with a fresh charge of bruised or cut fruit and again subjected to the action of the steam, as before, and so on until the whole fruit, or so much of it as is desired, has been disposed of. Meanwhile, as soon as the fermenting-vessel has been filled, or nearly filled, a portion of sugar is then added to the must, in quantity but little more than what is necessary to excite and support vinous fermentation, as such fruits are deficient in saccharine matter; care being taken, however, not to add too much, so as to generate too much alcohol, but simply to leave the wine with an agreeably sweetish taste. Thus prepared it is allowed to ferment, and is treated during this process in the same manner as other wines.

With reference to the boiling process I prefer to use steam as the agent, as it seems to develop and extract the aromatic principles and essential oils peculiar to fruits better than any other application of heat; but heat may be applied directly to the boiling-vat for the same purpose; or the boiling-vat may be arranged on the inside of another vat filled with water, and, through the application of heat to the latter, boiled.

Again, instead of first bruising or cutting the fruit preparatory to being boiled or digested it may be steamed first and then bruised; or, instead of steaming it when whole, a little water may be added to it and then boiled in the ordinary way, or by the application of steam through a coil of pipes arranged in the vat, and that whether the fruit is entire, cut, or bruised.

The length of time required for the cooking may vary with the fruit, some kinds requiring much longer time than others, but as a rule the fruit for all practical purposes will be found to have been sufficiently digested in from one to five hours, care being had to avoid, under all circumstances, tumultuous boiling; in fact, it is better simply to keep it slightly below than at boiling heat, in order to avoid the carrying off with the steam of the aromatic principles and essential oils of the fruits.

The amount of sugar used varies according to the amount of saccharine matter contained in the fruit and kind of fruit being operated upon, but as a rule, from one to three and a-half pounds per gallon will be sufficient—limes and lemons requiring more than oranges, unless the sweet lemons are used.

A wine prepared in this manner from oranges, limes, or lemons, while having a most agreeable aromatic flavor and odor, not only possesses great febrifuge properties, but at the same time acts as a gentle stimulant.

Having thus described my invention, what I claim as new, and desire to secure by Letters Patent, is—

A wine made from oranges, limes, or lemons, or fruits of that class of which they are the representatives, in the manner described, to wit, by first boiling or otherwise digesting the fruit with steam and then adding saccharine matter to the liquid obtained therefrom, and afterward subjecting the must thus prepared to vinous fermentation, as specified.

JNO. C. BAXTER.

Witnesses:
P. HANNAY,
DONALD STUART.